United States Patent
Tanabe

(10) Patent No.: US 7,911,913 B2
(45) Date of Patent: *Mar. 22, 2011

(54) INFORMATION RECORDING APPARATUS, INFORMATION REPRODUCING APPARATUS, INFORMATION RECORDING METHOD, INFORMATION REPRODUCING METHOD, AND OPTICAL INFORMATION RECORDING MEDIUM

(75) Inventor: Norihiro Tanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 303 days.

This patent is subject to a terminal disclaimer.

(21) Appl. No.: 12/214,124

(22) Filed: Jun. 17, 2008

(65) Prior Publication Data
US 2009/0003176 A1    Jan. 1, 2009

(30) Foreign Application Priority Data
Jun. 26, 2007 (JP) ................. 2007-167270

(51) Int. Cl.
G11B 7/00 (2006.01)
(52) U.S. Cl. .................. 369/94; 369/130; 369/44.11
(58) Field of Classification Search .......... None
See application file for complete search history.

(56) References Cited

U.S. PATENT DOCUMENTS

| | | | |
|---|---|---|---|
| 6,139,933 A * | 10/2000 | Van Wijk | 428/64.1 |
| 6,909,684 B2 | 6/2005 | Kawano et al. | |
| 2002/0181253 A1 * | 12/2002 | Watanabe | 363/21.01 |
| 2002/0181353 A1 * | 12/2002 | Katayama | 369/44.37 |
| 2003/0133391 A1 * | 7/2003 | Holtslag et al. | 369/94 |
| 2007/0253307 A1 * | 11/2007 | Mashimo | 369/94 |
| 2007/0285751 A1 | 12/2007 | Kim | |

FOREIGN PATENT DOCUMENTS

| JP | 2003-110999 A | 4/2003 |
|---|---|---|
| JP | 2004-320441 A | 11/2004 |
| JP | 2005-303511 A | 10/2005 |

* cited by examiner

Primary Examiner — Joseph Haley
(74) Attorney, Agent, or Firm — Wolf, Greenfield & Sacks, P.C.

(57) ABSTRACT

An information recording apparatus for recording information on a multi-layered optical information recording medium having a recording material, which has light reaction property and which changes quality due to heat generated by an irradiated light, and having an altered layer in which the recording material is already altered and a non-altered layer in which the recording material is not yet altered alternately existing in plurals is provided. The information processing device includes a light source for emitting a recording light having a predetermined wavelength; a focal position control unit for controlling a focal position of the recording light emitted from the light source; and an objective lens, arranged at a post-stage of the focal position control unit, for collecting the recording light; wherein the recording material at the focal position is altered through heat by the recording light to record information on the recording medium as a recording mark.

31 Claims, 7 Drawing Sheets

ALTERNATION BY HEAT OCCURS ONLY WITHIN FOCAL DEPTH, GENERATE RECORDING MARK

MORE LOCALIZED RECORDING MARK FORMS WITHIN FOCAL DEPTH

RECORDING MARK LIKELY TO GENERATE AT POSITION ADJACENT TO FOCAL DEPTH

INFORMATION RECORDING APPARATUS, INFORMATION REPRODUCING APPARATUS, INFORMATION RECORDING METHOD, INFORMATION REPRODUCING METHOD, AND OPTICAL INFORMATION RECORDING MEDIUM

CROSS-REFERENCE TO RELATED APPLICATION

The present invention contains subject matter related to Japanese Patent Application JP 2007-167270 filed in the Japan Patent Office on Jun. 26, 2007, the entire contents of which being incorporated herein by reference.

BACKGROUND OF THE INVENTION

1. Field of the Invention

The present invention relates to an information recording apparatus, an information reproducing apparatus, an information recording method, an information reproducing method, and an optical information recording medium.

2. Description of the Related Art

In the past, disc-shaped optical discs are being widespread used as optical information recording media, and generally, CD (Compact Disc), DVD (Digital Versatile Disc), Blu-Ray Disc (registered trademark, hereinafter also referred to as BD), and the like are being used.

In an optical disc device responding to such optical disc, various information such as various contents of music content, picture content, and the like or various data for computers, and the like are being recorded on the optical disc. In recent years, in particular, larger capacity of the optical disc is being desired with increase in the amount of information due to higher resolution of pictures, higher sound quality of music, and the like, and demand for increase in the number of contents to be recorded on one optical disc.

One method of increasing the capacity of the optical disc is proposed in which information is recorded by interfering light beams of two systems and forming microscopic holograms in the recording medium (see e.g., Japanese Patent Application Laid-Open No. 2006-78834).

SUMMARY OF THE INVENTION

However, in the method described in Japanese Patent Application Laid-Open No. 2006-78834, an advanced control of simultaneously aligning the focal positions of two types of light beams at a location desired to record the information is performed on a rotating and vibrating optical disc, and thus the configuration of the optical disc device using the relevant method becomes complex, and stable recordation or reproduction of information becomes difficult.

In view of the above issues, it is desirable to provide a novel and improved information recording apparatus capable of stably recording or reproducing information, and capable of obtaining a satisfactory signal to noise ratio, an information reproducing apparatus, an information recording method, an information reproducing method, and an optical information recording medium.

According to an embodiment of the present invention, there is provided an information recording apparatus for recording information on a multi-layered optical information recording medium having a recording material, which has light reaction property and/or thermal chemical reaction property and which changes quality due to irradiated light and/or heat generated by the light, and including an altered layer in which the recording material is already altered and a non-altered layer in which the recording material is not yet altered alternately existing in plurals; the information recording apparatus including a light source for emitting a recording light including a predetermined wavelength; a focal position control unit for controlling a focal position of the recording light emitted from the light source; and an objective lens, arranged at a post-stage of the focal position control unit, for collecting the recording light; wherein the recording material at the focal position is altered through heat by the recording light to record information on the optical information recording medium as a recording mark.

According to such configuration, the light source emits a recording light including a predetermined wavelength, the focal position control unit controls the focal position of the recording light emitted from the light source, and the objective lens irradiates the recording light onto the optical information recording medium. The recording material of the optical information recording medium at the light collected position of the recording light is thermally altered by the recording light, and information is recorded as a recording mark. The relevant information recording apparatus records information on the optical information recording medium having a so-called threshold characteristic, and thus can stably record information.

A focal depth of the recording light may be greater than or equal to a thickness of the altered layer and/or the non-altered layer.

A wavelength of the recording light may have high absorptance with respect to the altered layer. A wavelength of the recording light may have high absorptance with respect to the non-altered layer.

A wavelength of the recording layer may have a large difference between absorptance with respect to the altered layer and absorptance with respect to the non-altered layer.

The focal position control unit may control the focal position of the recording light so as to be a position where the non-altered layer exists; and the recording light may alter the recording material in the non-altered layer to record the recording mark.

The focal position control unit may control the focal position of the recording light so as to be a position where the altered layer exists; and the recording light may alter the recording material in the altered layer to record the recording mark.

The focal position control unit may be configured by one or a plurality of optical members; and the focal position of the recording light may be controlled by changing the position of the one or the plurality of optical members.

The focal position control unit may be configured by a relay lens or a collimator lens.

A layer to be recorded with the recording mark may have large optical absorption at the wavelength of the recording light compared to a layer not to be recorded with the recording mark.

A layer to be recorded with the recording mark may have large heat conduction constant compared to a layer not to be recorded with the recording mark.

A glass transition temperature of a layer to be recorded with the recording mark may be lower than a glass transition temperature of a layer not to be recorded with the recording mark.

According to another embodiment of the present invention, there is provided an information reproducing apparatus for reading and reproducing a recorded recording mark from an optical information recording medium having a recording material, which has light reaction property and/or thermal chemical reaction property and which changes quality due to irradiated light and/or heat generated by the light, including an altered layer in which the recording material is already altered and a non-altered layer in which the recording material is not yet altered alternately existing in plurals, and including information recorded as the recording mark involving alteration through heat in the altered layer or the non-altered layer; the information reproducing apparatus including a light source for emitting a reading light including a predetermined wavelength; a focal position control unit for controlling a focal position of the reading light emitted from the light source; an objective lens arranged at a post-stage of the focal position control unit, for collecting the reading light; and a light detector for detecting a returning light corresponding to the reading light from the recording mark.

According to such configuration, the light source emits a reading light including a predetermined wavelength, the focal position control unit controls the focal position of the reading light emitted from the light source, the objective lens collects the reading light on the recording mark of the optical information recording medium, and the light detector detects the returning light corresponding to the reading light from the recording mark. The relevant information reproducing apparatus generates a reproduction signal based on the detected returning light, and reproduces the information recorded on the optical information recording medium.

A focal depth of the reading light may be greater than or equal to a thickness of the altered layer and/or the non-altered layer.

A wavelength of the reading light may be the same as a wavelength of a recording light used to record the recording mark.

A wavelength of the reading light may have low absorptance with respect to the non-altered layer or may have low absorptance with respect to the altered layer compared to a recording light used in recording the recording mark.

The focal position control unit may control the focal position of the reading light so as to be a position where the non-altered layer exists; and the light detector may detect the returning light from the recording mark in the non-altered layer.

The focal position control unit may control the focal position of the reading light so as to be a position where the altered layer exists; and the light detector may detect the returning light from the recording mark in the altered layer.

The focal position control unit may be configured by one or a plurality of optical members; and the focal position of the reading light may be controlled by changing the position of the one or the plurality of optical members.

The focal position control unit may be configured by a relay lens or a collimator lens.

The optical information recording medium may be initialized by two initialization light beams; one of the two initialization light beams may enter the optical information recording medium from a surface on one side of the optical information recording medium; and the other of the two initialization light beams may enter the optical information recording medium from a surface on the other side of the optical information recording medium.

Magnitudes of incident angles with respect to the surfaces of the optical information recording medium of the two initialization light beams may be equal.

The initialization may be performed using the initialization light beam of wavelength $\lambda$[nm] such that thicknesses of the altered layer and the non-altered layer become $\Delta D$[nm]; and the incident angle $\theta$ of the two initialization light beams may take a value obtained from Equation 1.

$$\theta = \sin^{-1}\left(\frac{\lambda}{2\Delta D}\right) \quad \text{(Equation 1)}$$

The optical information recording medium may be initialized by an initialization light beam of a wavelength having light sensitivity with respect to the recording material.

The initialization light beam may be a parallel light beam.

A beam diameter of the initialization light beam may have a size for irradiating the entire surface of the recording material.

According to an embodiment of the present invention, there is provided an information recording method for recording information on a multi-layered optical information recording medium having a recording material, which has light reaction property and/or thermal chemical reaction property and which changes quality due to irradiated light and/or heat generated by the light, and including an altered layer in which the recording material is already altered and a non-altered layer in which the recording material is not yet altered alternately existing in plurals; the information recording method including the steps of controlling, with respect to a recording light including a predetermined wavelength emitted from a light source, a focal position of the recording light and irradiating the recording light on a predetermined layer of the optical information recording medium; and altering the recording material in the predetermined layer irradiated with the recording light through heat generated by the recording light to record information as a recording mark.

According to such configuration, the focal position of the recording light including a predetermined wavelength emitted from the light source is controlled and the recording light is irradiated on a predetermined layer of the optical information recording medium in the step of irradiating the recording light; and the recording material irradiated with the recording light is altered through heat and information is recorded as a recording mark in the step of recording information. According to such information recording method, recordation of information is performed on the optical information recording medium having an altered layer in which the recording material is already altered and a non-altered layer in which the recording material is not yet altered alternately existing in plurals, and thus information is stably recorded.

According to another embodiment of the present invention, there is provided an information reproducing method for reading and reproducing a recorded recording mark from an optical information recording medium having a recording material, which has light reaction property and/or thermal chemical reaction property and which changes quality due to irradiated light and/or heat generated by the light, including an altered layer in which the recording material is already altered and a non-altered layer in which the recording material is not yet altered alternately existing in plurals, and including information recorded as the recording mark involving alteration through heat in the altered layer or the non-altered layer; the information reproducing method including the steps of controlling, with respect to a reading light including a predetermined wavelength emitted from a light source, a focal position of the reading light and irradiating the reading light on the recording mark in a predetermined layer of the optical information recording medium; detecting a returning light of the reading light from the recording mark; and generating a reproduction signal of the information based on the detected returning light.

According to such configuration, the focal position of the reading light having a predetermined wavelength emitted from the light source is controlled and the reading light is irradiated on a predetermined layer of the optical information recording medium in the step of irradiating the reading light; the returning light from the recording mark recorded on the optical information recording medium is detected in the step of detecting the returning light of the reading light from the recording mark; and the reproduction signal of the information recorded on the optical information recording medium is generated based on the detected returning light in the step of generating a reproduction signal of the information. According to such information reproducing method, reading of information is performed from the optical information recording medium having an altered layer in which the recording material is already altered and a non-altered layer in which the recording material is not yet altered alternately existing in plurals, and thus information is stably reproduced.

According to another embodiment of the present invention, there is provided a multi-layered optical information recording medium having a recording material, which has light reaction property and/or thermal chemical reaction property and which changes quality due to irradiated light and/or heat generated by the light, wherein an altered layer in which the recording material is already altered and a non-altered layer in which the recording material is not yet altered alternately exist in plurals; information is recorded as a recording mark involving alteration through heat in the altered layer or the non-altered layer; and the recording mark recorded in the altered layer or the non-altered layer contact the non-altered layer or the altered layer adjacent to the recording mark.

According to the embodiments of the present invention described above, recordation and reproduction of information are performed using one type of light beam on the optical information recording medium having a so-called threshold characteristic, and thus information are stably recorded and reproduced, and a satisfactory signal to noise ratio can be obtained.

DETAILED DESCRIPTION OF THE PREFERRED EMBODIMENTS

Figure 1:
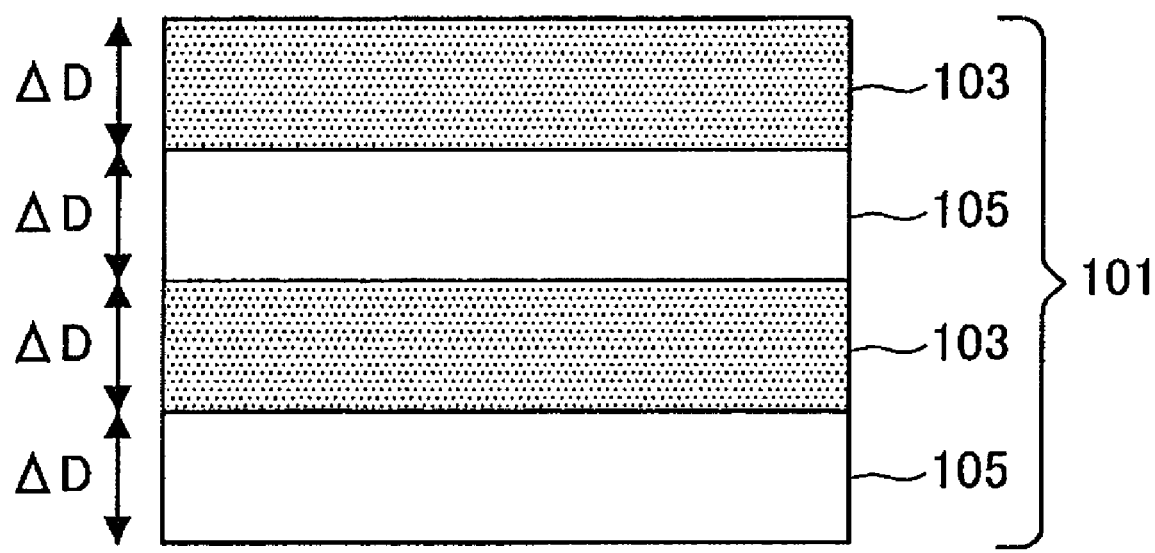
FIG. 1 is an explanatory view describing an optical information recording medium according to one embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment (Regarding Optical Information Recording Medium 10)

Figure 2:
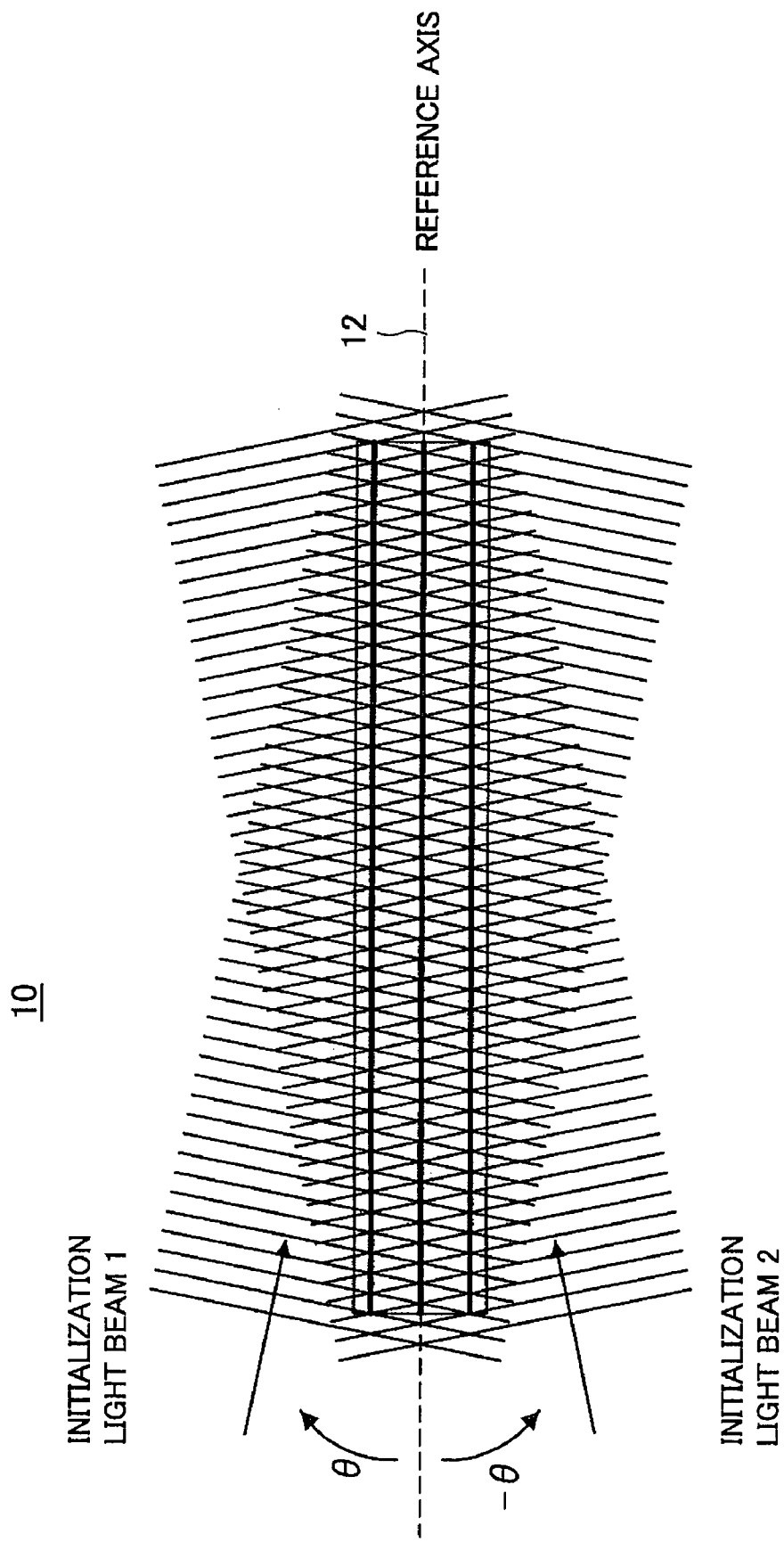
FIG. 2 is an explanatory view describing the optical information recording medium according to the embodiment.

First, an optical information recording medium used in an information recording apparatus and an information reproducing apparatus according to the first embodiment will be described in detail with reference to FIGS. 1 and 2. FIGS. 1 and 2 are explanatory views for describing the optical information recording medium 10 according to the present embodiment.

The optical information recording medium 10 according to the present embodiment includes a recording material 101 that has light reaction property and/or thermal chemical reaction property and that changes quality due to irradiated light and/or heat generated by the light; and a cover layer (not shown) arranged on both sides of the recording material 101. The optical information recording medium 10 may be formed to a square plate shape or a rectangular plate shape, or may be formed to a disc shape such as an optical disc.

The recording material 101 is a compound that changes quality as a result of various changes caused through heating by the energy of light or the energy of the light itself. The change that occurs in the recording material 101 includes physical changes such as change in hardness etc. of the recording material 101 and phase change of the recording material 101 from crystal phase to amorphous phase or from amorphous phase to crystal phase; chemical changes including change of the recording material 101 to a new compound or precipitation or aggregation of the newly generated compound such as change of monomer to oligomer or polymer and cross linkage of polymers due to photochemical reaction in the recording material 101; and the like. The change also includes a case where the recording material 101 itself disappears due to sublimation through heating by the energy of light.

The recording material 101 in which the changes described above may occur uses thermoplastic such as heat curing resin; photopolymer such as photo-polymerized photopolymer and photo cross linked photopolymer; photorefractive crystal using crystals of ferroelectric material and paraelectric material; hologram recording material etc. The recording material 101 contains organic metal compound or inorganic metal compound, and such organic metal compound or inorganic metal compound may be the recording material that precipitates according to temperature change. The recording material according to the present embodiment is not limited to the above, and an arbitrary material may be used as long as it is a substance which quality changes by light irradiation. The time necessary for initialization process and signal recording process described below is determined by light sensitivity etc. of the recording material 101, and thus the time necessary for initialization and the transfer rate in time of recording can be enhanced by using recording material having satisfactory light sensitivity.

The cover layer is a layer formed using a material having sufficient transmissivity with respect to the wavelength of the initialization light beam (in other words, material that does not absorb light of wavelength of the initialization light beam), where the thickness of the cover layer is appropriately adjusted so that the necessary transmissivity of the initialization light beam is obtained. The cover layer may be formed using glass substrate, plastic resin substrate made of polycarbonate etc., and the like.

If the performance and the durability necessary for the optical information recording medium 10 are realized with the recording material 101 alone, the cover layer may not be arranged on both sides of the recording material 101.

As shown in FIG. 1, the recording material 101 of the optical information recording medium 10 described above is initialized by a predetermined initialization process such that a layer (non-altered layer) 103 in which the recording material 101 is not yet altered, and a layer (altered layer) 105 that is already altered alternately exist in plurals. The non-altered layer 103 and the altered layer 105 alternately exist in plurals so that the optical information recording medium 10 functions as an information recording medium having a so-called threshold characteristic.

As shown in FIG. 2, the initialization process of the optical information recording medium 10 is carried out using two initialization light beams (initialization light beam 1 and initialization light beam 2). A parallel light beam of a wavelength having coherency and having light sensitivity with respect to the recording material 101 is used for the relevant initialization light beams. As shown in FIG. 2, the initialization light beam 1 enters from a surface on one side of the optical information recording medium 10, and the initialization light beam 2 enters from the surface on the other side of the optical information recording medium 10. In this case, the light path of each initialization light beam is adjusted such that the magnitude of an incident angle to the optical information recording medium 10 of the initialization light beam 1 and the magnitude of an incident angle to the optical information recording medium 10 of the initialization light beam 2 become equal. The incident angle to the optical information recording medium of the initialization light beam is defined as an angle formed by an optical axis of the initialization light and a reference axis 12 parallel to the surface of the optical information recording medium 10. The beam diameters of the initialization light beam 1 and the initialization light beam 2 preferably have a size capable of irradiating the entire surface of the optical information recording medium 10.

When the initialization light beam 1 and the initialization light beam 2 having coherency enter the optical information recording medium 10, such initialization light beams interfere in the optical information recording medium 10, thereby generating a standing wave in the recording material 101. The recording material 101 of the optical information recording medium 10 physically and/or chemically changes quality due to the intensity distribution of the standing wave. As a result, the non-altered layer 103 and the altered layer 105 as shown in FIG. 1 are alternately formed inside the optical information recording medium 10. In other words, the initialization process can also be considered as a process of irradiating light of a predetermined wavelength on the optical information recording medium 10, and recording a large hologram over the entire optical information recording medium 10. When the incident angles of the initialization light beam 1 and the initialization light beam 2 are ±θ with respect to the reference axis 12 (i.e., when the incident angles of the initialization light beam 1 and the initialization light beam 2 are symmetric with respect to the reference axis 12), the interface between the non-altered layer 103 and the altered layer 105 becomes parallel to the reference axis 12.

The thickness ΔD[nm] of the layers of the non-altered layer 103 and the altered layer 105 formed in the recording material 101 of the optical information recording medium 10 depend on the standing wave generated in the optical information recording medium 10. When the wavelength of the initialization light beam entering the optical information recording medium 10 is λ[nm] and the initialization light beam enters the optical information recording medium 10 at an incident angle θ, the thickness ΔD of the layer can be expressed with the following Equation 101.

$$\Delta D \propto \frac{\lambda}{2\sin\theta} \quad \text{(Equation 101)}$$

The wavelength λ of the initialization light beam is fixed to a wavelength having light sensitivity with respect to the recording material 101 of the optical information recording medium 10, and thus the thickness of the layers of the non-altered layer 103 and the altered layer 105 can be controlled to an arbitrary value and the number of non-altered layer 103 and altered layer 105 to be formed may be controlled by controlling the incident angle θ to the optical information recording medium 10.

In other words, the thickness of the non-altered layer 103 and the altered layer 105 can be made to the desired thickness by performing a control such that the incident angle θ to the optical information recording medium 10 of the initialization light beam becomes a value calculated in the following Equation 102.

$$\theta = \sin^{-1}\left(\frac{\lambda}{2\Delta D}\right) \quad \text{(Equation 102)}$$

The non-altered layer 103 or the altered layer 105 formed in the recording material 101 of the optical information recording medium 10 serve as recording layers on which various information are recorded. In this case, whether to use the non-altered layer 103 as the recording layer or to use the altered layer 105 as the recording layer can be appropriately selected according to alteration that occurred in the recording material 101, time (recording time) necessary for the recording process to be hereinafter described, size of the recording mark, and the like.

When the absorptance of the recording material 101 existing in one of the layers of the non-altered layer 103 and the altered layer 105 and the absorptance of the recording material 101 existing in the other layer are compared, the layer of high absorptance is assumed as the recording layer and the layer of low absorptance is assumed as the non-recording layer. This is because heat change by optical absorptance can be produced in a short period of time and the recording time can be reduced by having the layer of high absorptance as the recording layer.

Similarly, when the glass transition temperature of the recording material 101 existing in one of the layers of the non-altered layer 103 and the altered layer 105 and the glass transition temperature of the recording material 101 existing in the other layer are compared, the layer of low glass transition temperature is assumed as the recording layer and the layer of high glass transition temperature is assumed as the non-recording layer. This is because the amount of heat change necessary for altering the recording material can be made small by having the layer of low glass transition temperature as the recording layer.

When the heat conduction constant of the recording material 101 existing in one of the layers of the non-altered layer 103 and the altered layer 105 and the heat conduction constant of the recording material 101 existing in the other layer are compared, the layer of large heat conduction constant is assumed as the recording layer and the layer of small heat conduction constant is assumed as the non-recording layer. This is because the heat is not conducted to the layer of small heat conduction constant and the heat can be localized in the recording layer by having the layer of large heat conduction constant as the recording layer, so that the recording time can be reduced and the recording mark localized in the optical axis direction of the recording light can be formed.

The optical information recording medium 10 performed with initialization is definitely segmented to a layer (recording layer) capable of recording information and a layer not capable of recording information by being alternately formed with the non-altered layer 103 and the altered layer 105 in the recording material 101. Therefore, the optical information recording medium 10 performed with initialization has a so-called threshold characteristic. The thickness ΔD of the non-altered layer 103 and the altered layer 105 is preferably less than or equal to a focal depth in a recording optical system as hereinafter described.

A case in which two non-altered layers 103 and two altered layers 105 are formed is illustrated in FIG. 1, but the number of non-altered layer 103 and the altered layer 105 to be formed in the recording material 101 of the optical information recording medium 10 is not limited to such example, and a multi-layer structure including an arbitrary number of layers may be formed.

If initialization is performed on the optical information recording medium 10 using photo-polymerized photopolymer and the like as the recording material 101, the photo-polymerization reaction advances according to the intensity distribution of the standing wave generated in the optical information recording medium 10, and a layer (non-altered layer 103) in which the monomers in the recording material 101 exist as monomers and a layer (altered layer 105) in which the monomers in the recording material 101 are polymerized to polymers are alternately formed. In the altered layer 105, the light cross linking reaction may advance in addition to the photo-polymerization reaction.

If initialization is performed on the optical information recording medium 10 using recording material which contains organic metal compound etc. and which organic metal compound precipitates according to temperate change as the recording material 101, the heat generates according to the intensity distribution of the standing wave generated in the optical information recording medium 10, and temperature gradient produces in the recording material 101. As a result, a layer (non-altered layer 103) in which the recording material 101 exists without being altered and a layer (altered layer 105) in which the recording material 101 is altered and the organic metal compound is precipitated are alternately formed.

If initialization is performed on the optical information recording medium 10 using resin which contains inorganic metal compound etc. and which has light reaction property as the recording material 101, the heat generates according to the intensity distribution of the standing wave generated in the optical information recording medium 10, and temperature gradient produces in the recording material 101. As a result, a layer (non-altered layer 103) in which the resin is not cured and the inorganic metal compound is not altered and a layer (altered layer 105) in which the resin is cured and the inorganic metal compound is altered are alternately formed.

(Regarding Information Recording Apparatus 20)

Figure 3:
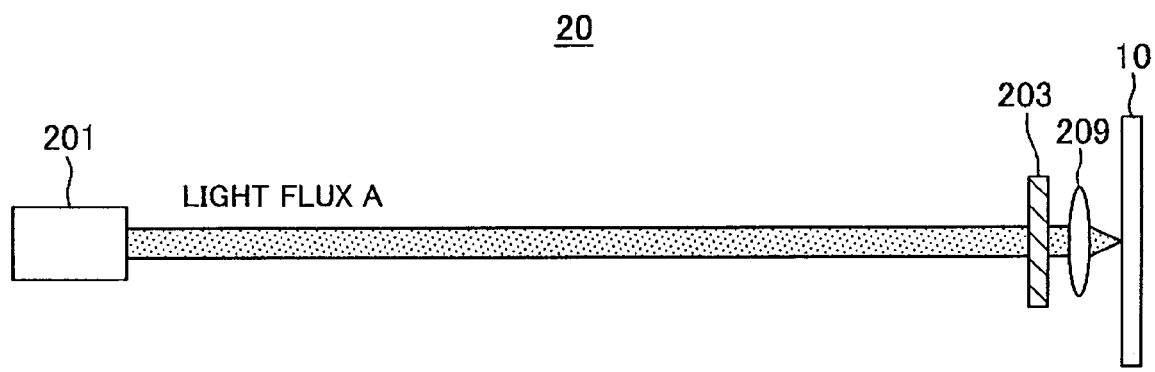
FIG. 3 is an explanatory view describing an information recording apparatus according to the embodiment.
Figure 4:
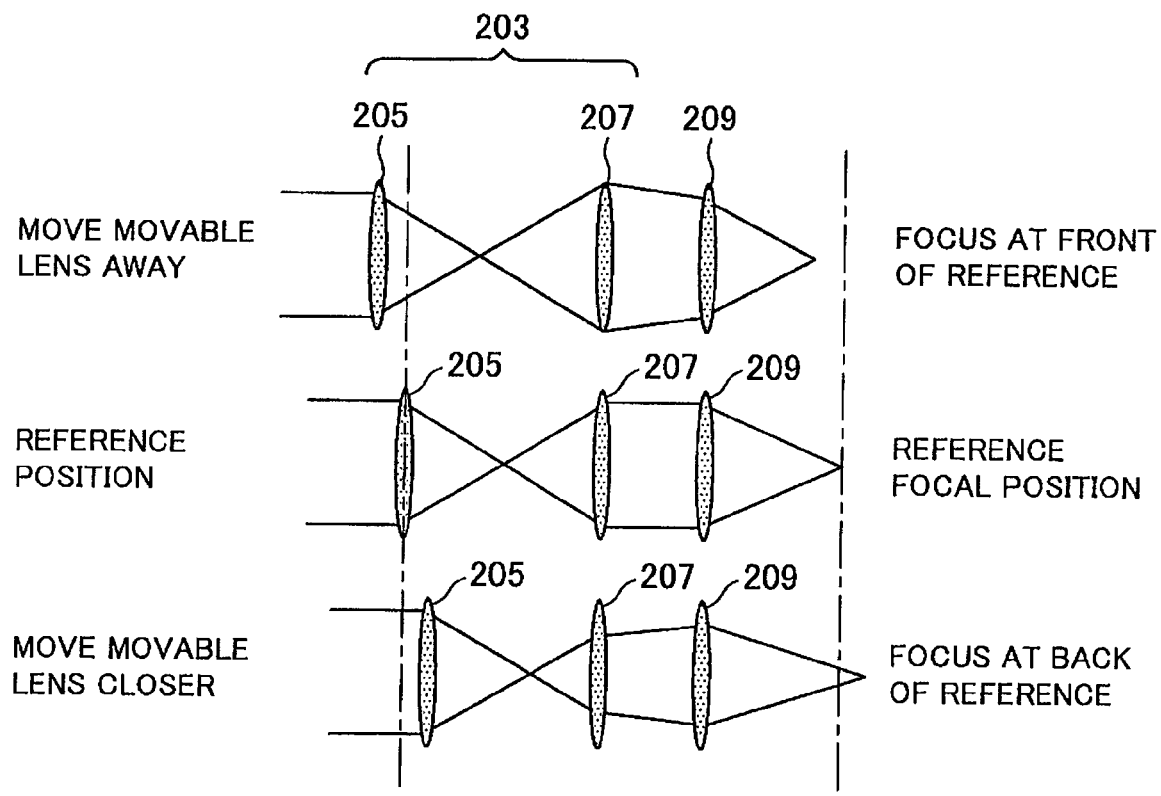
FIG. 4 is an explanatory view describing one example of a focal position control unit according to the embodiment.

An information recording apparatus 20 according to the present embodiment will now be described in detail with reference to FIGS. 3 and 4. FIG. 3 is an explanatory view describing the information recording apparatus 20 according to the present embodiment, and FIG. 4 is an explanatory view describing one example of a focal position control unit according to the present embodiment.

The information recording apparatus 20 according to the present embodiment is configured to integrally control the entire body by means of a recording apparatus control unit (not shown) including CPU (Central Processing Unit), ROM (Read Only Memory), RAM (Random Access Memory), and the like, and is able to perform information recording process on the optical information recording medium by reading out various programs such as basic program and information recording program stored in the ROM, the storage unit, and the like, which are not illustrated, and developing such programs in the RAM (not shown) and the like.

As shown in FIG. 3, the information recording apparatus 20 according to the present embodiment is a so-called heat mode device including a light source 201, a focal position control unit 203, and an objective lens 209, and records information on the optical information recording medium 10 performed with initialization process as described above.

The light source 201 emits a light beam having a predetermined wavelength. The wavelength, the light power, and the like of the light beam to be emitted take an arbitrary value according to the size etc. of the recording mark recorded as information on the optical information recording medium 10. A visible light beam of about 405 nm to 780 nm may be used, or a visible light beam or an ultraviolet light of less than 405 nm may be used for the wavelength of the light beam emitted by the light source 201. The light power of the light beam to be emitted is one factor for determining the time necessary for altering the recording material 101 of the optical information recording medium 10, and may take an arbitrary value according to the specification of the information recording apparatus 20, the material of the optical information recording medium 10, and the like.

A solid laser, a semiconductor laser, and the like can be used as one example of the light source 201.

The information recording apparatus 20 according to the present embodiment uses the light beam (light flux) emitted from the relevant light source 201 as recording light for recording information on the optical information recording medium 10.

The wavelength of the recording light may be a wavelength having high absorptance with respect to the altered layer, or may be a wavelength having high absorptance with respect to the non-altered layer. Alternatively, the wavelength of the recording light may be a wavelength in which the difference between the absorptance with respect to the altered layer and the absorptance with respect to the non-altered layer becomes large.

The focal position control unit 203 is used with the objective lens 209 hereinafter described, and controls the focal position of a light flux A or the recording light emitted from the light source 201. Normally, the focal position of the light flux A has the position that becomes a reference determined by focal length etc. of the objective lens 209 used in the information recording apparatus 20, but the focal position control unit 203 according to the present embodiment can change the focal position of the light flux A by using one or a plurality of optical members. The focal position control unit 203 will be described in detail below.

The objective lens 209 is arranged at the post-stage of the focal position control unit 203, and collects the light flux A or the recording light emitted from the light source 201 at the position of the focal length of the objective lens 209. The spot diameter of the light flux A can be controlled by appropriately selecting the numerical aperture (NA) of the objective lens 209. An objective lens having a numerical aperture between 0.45 and 0.85 may be selected for the objective lens 209. One biconvex lens is illustrated for the objective lens 209 in FIGS. 3 and 4, but the objective lens 209 according to the present invention is not limited thereto, and may be an aspheric lens, or an objective lens including a plurality of lenses.

(Regarding Focal Position Control Unit 203)

An optical member such as a relay lens or a collimator lens may be used as the focal position control unit 203. In the following description, a case of using the relay lens including a movable lens 205 and a fixed lens 207 for the focal position control unit 203 will be described in detail, one example of which is shown in FIG. 4, but the focal position control unit 203 according to the present embodiment is not limited thereto, and an arbitrary type may be used as long as the focal position of the optical system can be controlled. The focal position control unit 203 is arranged at the pre-stage of the objective lens 209, and changes the focal position of the light flux A collected by the objective lens 209 by changing the position of the movable lens 205 with a drive device (not shown), and the like.

When the movable lens 205 is at a predetermined reference position, the relay lens collects the light flux A at the focal position that becomes a reference (reference focal position) by the objective lens 209. When the movable lens 205 is moved towards the front side of the reference position, and away from the fixed lens 207 (i.e., move the movable lens 205 towards the light source 201 side), the light flux A focuses on the front of the reference focal position. On the contrary, when the movable lens 205 is moved towards the far side from the reference position, and closer to the fixed lens 207 (i.e., move the movable lens 205 towards the objective lens 209 side), the light flux A focuses on the back of the reference focal position. Through the use of such method, the position at which the light flux A focuses can be controlled, and the light flux A can be collected at the position at where the information is to be recorded in the optical information recording medium 10.

The relevant relay lens is merely an example of the focal position control unit 203, and the focal position control unit 203 in the information recording apparatus 20 according to the present invention is not limited thereto, and a collimator lens connected with a drive device for changing the position of the lens, and the like, may be used.

(Regarding Information Recording Method)

Figure 5:
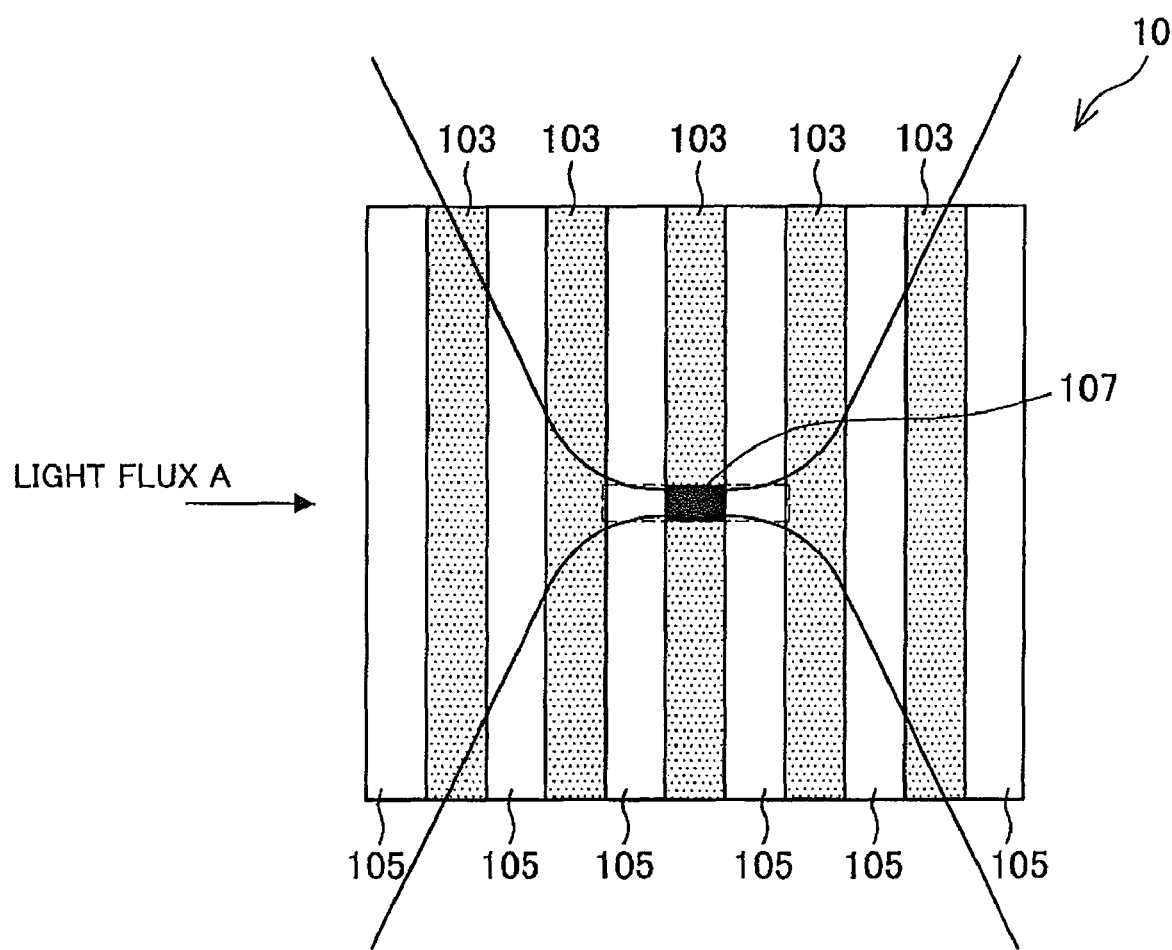
FIG. 5 is an explanatory view describing an information recording method according to the embodiment.

A method of recording information as recording mark in a multi-layer optical information recording medium 10 having a so-called threshold characteristic will now be described in detail with reference to FIG. 5. FIG. 5 is an explanatory view for describing the information recording method according to the present embodiment.

The information recording apparatus 20 according to the present embodiment records information on the optical information recording medium 10 by corresponding such that the recording mark is recorded when the binarized information has a value of "1", and the recording mark is not recorded when the binarized information has a value of "0".

The light flux A (recording light) controlled so as to be collected at the predetermined focal position by the focal position control unit 203 and the objective lens 209 is collected at the predetermined non-altered layer 103 of the optical information recording medium 10, as shown in FIG. 5. The curves shown on the upper side and the lower side of FIG. 5 are curves of a beam spot of the recording light. The collected recording light drastically raises the temperature near the focus by the light power of the recording light, which temperature rise causes the recording material 101 of the non-altered layer 103 to alter at the light collected point and become a recording mark 107. As a result of such alteration, change in index of refraction involved in metal precipitation, solid state property change, change in cavity generation, and the like occur depending on the type of recording material, whereby the index of refraction and the reflectivity differ between a portion where the recording mark 107 exists and a portion where the recording mark 107 does not exist in the non-altered layer 103.

Since the optical information recording medium 10 according to the present embodiment has each layer thickness of the non-altered layer 103 and the altered layer 105 of less than or equal to the focal depth of the recording light by the initialization process described above, the recording material 101 altered in the non-altered layer 103 contacts the altered layer 105 adjacent to the non-altered layer 103 in time of recording. The portion around the focal depth of the recording light also has a light power of an extent of causing drastic temperature rise, but since the altered layer 105 adjacent to the non-altered layer 103 is changed to solid state property that is difficult to cause thermal alteration by the initialization process in the optical information recording medium 10 according to the present embodiment, thermal change may not occur by selecting the condition such as the recording time to an arbitrary value. Therefore, the optical information recording medium 10 recorded with information by the information recording apparatus 20 according to the present embodiment has the recording mark localized in the optical axis direction of the recording light, and the altered portion and the non-altered portion can be clearly distinguished. Thus, recording of information with satisfactory signal to noise ratio (SNR) can be performed. In the present embodiment, signal recording is carried out by collecting light at the non-altered layer, but signal recording may be carried out with respect to the altered layer if the altered layer has solid state property that is more likely to cause thermal absorptance as a result of comparing the altered layer and the non-altered layer.

Figure 6A:
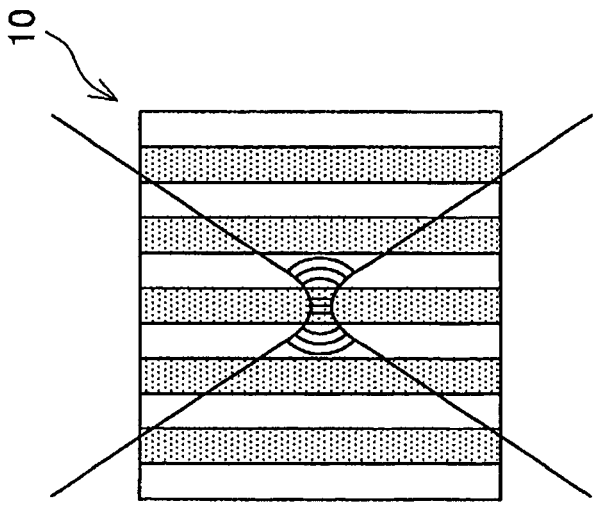
FIG. 6A is an explanatory view describing a relationship between a focal depth of the recording light, and a layer thickness of the non-altered layer and the altered layer according to the embodiment.
Figure 6B:
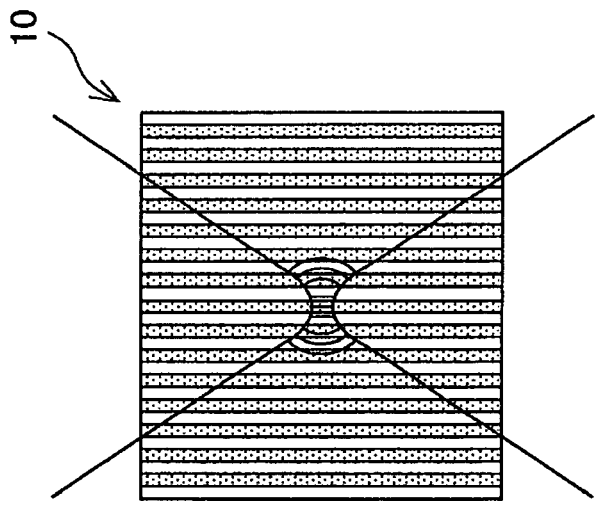
FIG. 6B is an explanatory view describing a relationship between the focal depth of the recording light, and the layer thickness of the non-altered layer and the altered layer according to the embodiment.
Figure 6C:
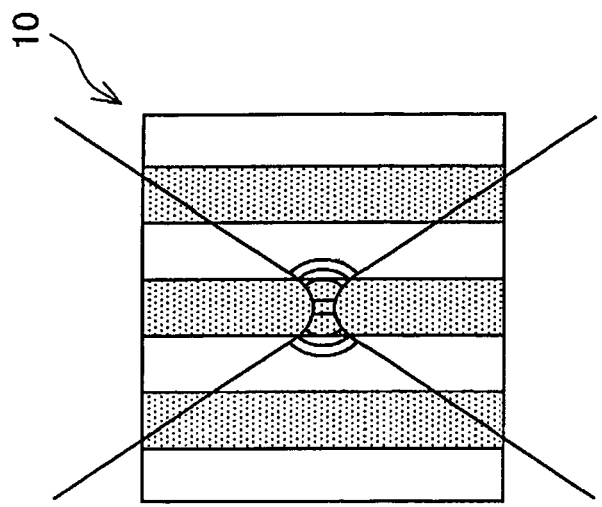
FIG. 6C is an explanatory view describing a relationship between the focal depth of the recording light, and the layer thickness of the non-altered layer and the altered layer according to the embodiment.

The relationship between the focal depth of the recording light, and the layer thickness of the non-altered layer 103 and the altered layer 105 will now be described in detail with reference to FIGS. 6A to 6C. FIGS. 6A to 6C are explanatory views describing the relationship between the focal depth of the recording light according to the present embodiment, and the layer thickness of the non-altered layer 103 and the altered layer 105, and shows a case where the recording light is collected on the non-altered layer 103. In the following description, the focal depth of the recording light is $\delta$, and the respective layer thickness of the non-altered layer 103 and the altered layer 105 is $\Delta D$.

FIG. 6A shows a case where the focal length of the recording light and the layer thickness of the non-altered layer 103 are equal ($\delta = \Delta D$). In the information recording apparatus 20 according to the present embodiment, drastic temperature rise occurs within the focal depth of the recording light, and thus alteration through heat occurs over the entire non-altered layer 103 of the location where the recording light is collected and a uniform recording mark 107 is generated in the case shown in FIG. 6A. As a result, the boundary in the optical axis direction of the recording light of the recording mark 107 contacts the adjacent altered layer 105.

FIG. 6B shows a case where the focal depth of the recording light is greater than or equal to the layer thickness of the non-altered layer 103 ($\delta \geqq \Delta D$) (in other words, when the layer thickness of the non-altered layer 103 is less than or equal to the focal depth of the recording light). In this case, a more localized uniform recording mark 107 is generated within the focal depth of the recording light. If the focal depth of the recording light is greater than the sum of the layer thicknesses of the non-altered layer 103 and the two altered layers 105 adjacent to such non-altered layer 103, the recording light has a possibility of simultaneously generating the recording mark 107 at two or more non-altered layers 103. Thus, a relationship $\delta \leq 3\Delta D$ is preferably met.

FIG. 6C shows a case where the focal depth of the recording light is less than the layer thickness of the non-altered layer 103 ($\delta < \Delta D$) (in other words, when the layer thickness of the non-altered layer 103 exceeds the focal depth of the recording light). In the case shown in FIG. 6C, since the layer thickness of the non-altered layer 103 is larger than the focal depth of the recording light, the light power of the recording light is not uniform within the non-altered layer 103, and a gradient is produced. As a result, temperature gradient produces in the temperature rise in the non-altered layer 103, and an uniform recording mark 107 becomes difficult to generate. Therefore, the focal depth of the recording light is preferably less than the layer thickness of the non-altered layer 103 and the altered layer 105.

(Specific Example of Recording Mark)

The recording mark 107 according to the present embodiment will be described below by way of specific examples of the recording material 101. For instance, when photo-polymerized photopolymer is used for the recording material 101, a monomer layer corresponding to the non-altered layer 103 and a polymer layer corresponding to the altered layer 105 are alternately formed by the initialization process. When the recording light is collected at the non-altered layer 103, drastic temperature rise occurs at the light collected location, the monomer of the light collected location changes to a polymer and becomes the recording mark 107. As a result, the index of refraction of the recording material 101 at the recording mark 107 differs from the index of refraction of the recording material 101 at the non-altered layer 103 at where the recording mark 107 does not exist, and the presence of the recording mark 107 can be clearly determined.

When the recording material containing organic metal compound is used for the recording material 101, the altered layer 105 or a layer in which the organic metal compound is precipitated and the non-altered layer 103 or a layer in which the organic metal compound is not precipitated are alternately formed by the initialization process. When the recording light is collected at the non-altered layer 103, drastic temperature rise occurs at the light collected location, and the recording material at the light collected location changes quality. As a result of such alteration, precipitation of the organic metal compound and cavity formation through heat rise occur at the light collected location, and becomes the recording mark 107. Due to precipitation of the organic metal compound and formation of cavity, the recording mark 107 causes drastic change in index of refraction compared to the location at where the recording mark does not exist, and reflects light, and thus the presence of the recording mark 107 can be clearly determined.

Similarly, when resin containing inorganic metal compound and having light response property is used for the recording material 101, a layer (altered layer 105) in which the resin is altered and the inorganic metal compound is precipitated and a layer (non-altered layer 103) in which the resin is not altered and the inorganic metal compound is not precipitated are alternately formed by the initialization process. When the recording light is collected at the non-altered layer 103, drastic temperature rise occurs at the light collected location, and the recording material at the light collected location changes quality. As a result of such alteration, curing of resin, precipitation of the inorganic metal compound, and cavity formation by heat rise occur at the light collected location, and becomes the recording mark 107. Due to precipitation of the inorganic metal compound and formation of cavity, the recording mark 107 causes drastic change in index of refraction compared to the location at where the recording mark does not exist, and reflects light, and thus the presence of the recording mark 107 can be clearly determined.

(Regarding Information Reproducing Apparatus 30)

Figure 7:
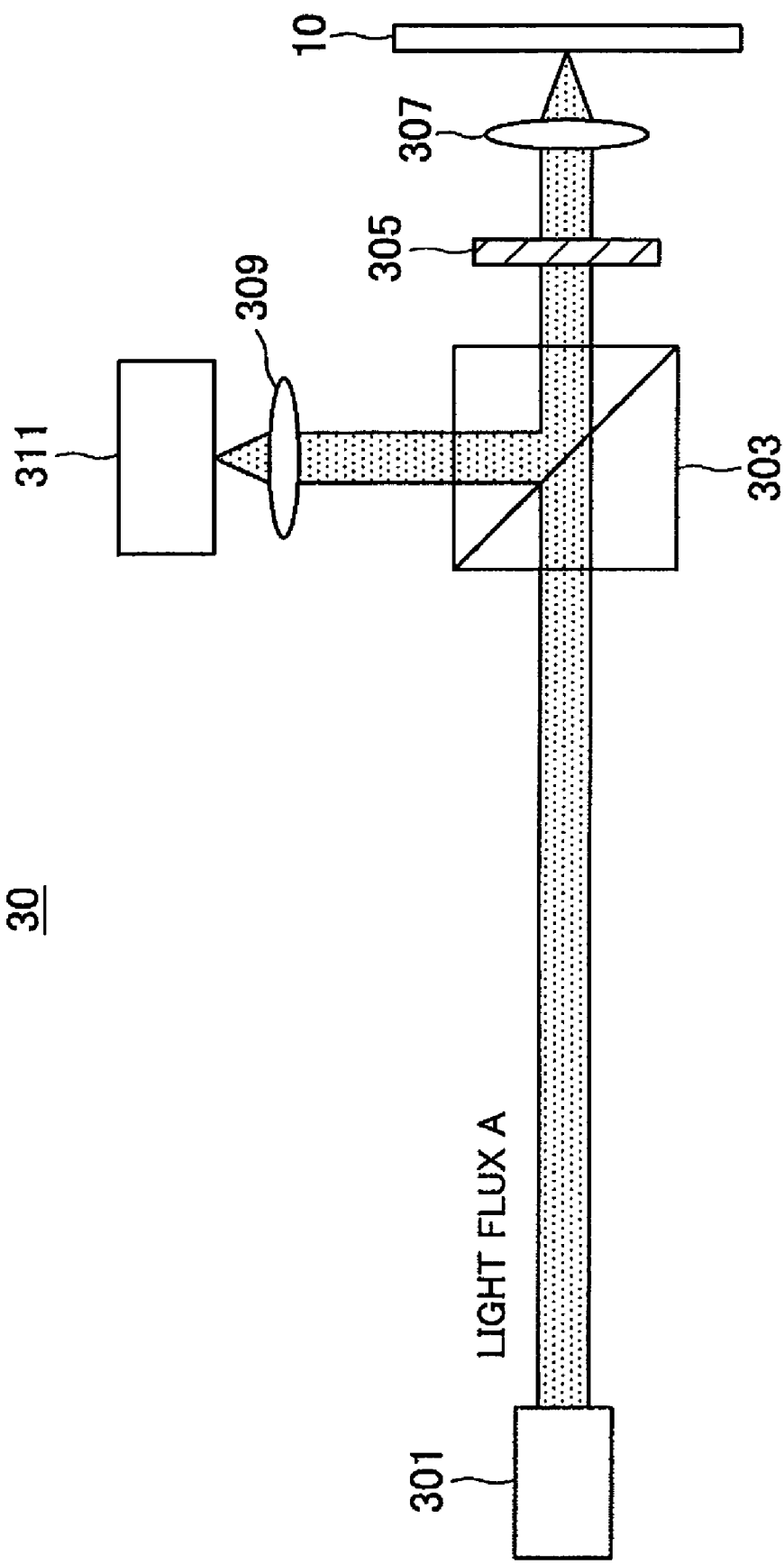
FIG. 7 is an explanatory view describing an information reproducing apparatus according to the embodiment.

The information reproducing apparatus 30 according to the present embodiment will be described in detail with reference to FIG. 7. FIG. 7 is an explanatory view for describing the information reproducing apparatus 30 according to the present embodiment.

The information reproducing apparatus 30 according to the present embodiment is configured to integrally control the entire body by means of a reproducing apparatus control unit (not shown) including CPU (Central Processing Unit), ROM (Read Only Memory), RAM (Random Access Memory), and the like, and is able to read out and reproduce information from the optical information recording medium by reading out various programs such as basic program and information reproducing program stored in the ROM, the storage unit, and the like, which are not illustrated, and developing such programs in the RAM (not shown) and the like.

As shown in FIG. 7, the information reproducing apparatus 30 according to the present embodiment includes a light source 301, a beam splitter 303 serving as a light beam branching unit, a focal position control unit 305, an objective lens 307, a light collecting lens 309, and a light detector 311, and reads out and reproduces information (recording mark) recorded on the optical information recording medium 10 performed with the initialization process.

The light source 301 emits a light beam having a predetermined wavelength. The wavelength, the light power, and the like of the light beam to be emitted take an arbitrary value according to the size etc. of the recording mark recorded as information on the optical information recording medium 10. A visible light beam of about 405 nm to 780 nm may be used, or a visible light beam or an ultraviolet light of less than 405 nm may be used for the wavelength of the light beam emitted by the light source 301. The light power of the light beam to be emitted is preferably a power weaker than the recording light so as not to cause alteration in the recording material 101 of the optical information recording medium 10. The wavelength of the light beam emitted by the light source 301 may be the same wavelength as the recording light.

A solid laser, a semiconductor laser, and the like can be used as one example of the light source 301.

The information reproducing apparatus 30 according to the present embodiment uses the light beam (light flux) emitted from the relevant light source 301 as a reading light for reading out information from the optical information recording medium 10.

The wavelength of the reading light may be a wavelength having low absorptance with respect to the non-altered layer, or may be a wavelength having low absorptance with respect to the altered layer, compared to the recording light.

The beam splitter 303 serving as the light beam branching unit transmits the reading light emitted from the light source 301 towards the optical information recording medium 10 side, and branches the returning light from the recording mark recorded on the optical information recording medium 10 and guides the same towards the light detector 311 side to be hereinafter described.

The focal position control unit 305 is used with the objective lens 307 hereinafter described, and controls the focal position of a light flux A or the reading light emitted from the light source 301. Normally, the focal position of the light flux A has the position that becomes a reference determined by focal length etc. of the objective lens 307 used in the information reproducing apparatus 30, but the focal position control unit 305 according to the present embodiment can change the focal position of the light flux A by using one or a plurality of optical members. The focal position control unit 305 has the same function and exhibits the same effects as the focal position control unit 203 in the information recording apparatus 20 according to the present embodiment, and thus the detailed description thereof will be omitted.

The objective lens 307 is arranged at the post-stage of the focal position control unit 305, and collects the light flux A or the reading light emitted from the light source 301 at the position of the focal length of the objective lens 307. The spot diameter of the light flux A can be controlled by appropriately selecting the numerical aperture of the objective lens 307. An objective lens having a numerical aperture between 0.45 and 0.85 may be selected for the objective lens 307. In FIG. 7, one biconvex lens is illustrated for the objective lens 307, but the objective lens 307 according to the present invention is not limited thereto, and may be an aspheric lens, or an objective lens including a plurality of lenses.

The light collecting lens 309 is arranged to collect the light beam branched by the beam splitter 303, and collects the returning light from the optical information recording medium 10 at the light detector 311 arranged at the post-stage of the light collecting lens 309. In FIG. 7, one biconvex lens is illustrated as the light collecting lens 309, but the light collecting lens 309 according to the present invention is not limited thereto, and may be an aspheric lens, or an objective lens including a plurality of lenses.

The light detector 311 detects the returning light from the optical information recording medium 10 collected by the light collecting lens 309. A light receiving element such as CCD (Charge Coupled Device) or PIN photodiode may be used for the light detector 311. In the light detector 311, the presence of the returning light is determined based on the difference in the detected light quantity. For instance, determination is made that the returning light exists if the light quantity detected by the light detector 311 is greater than or equal to a predetermined light quantity, and determination is made that the returning light does not exist if less than the predetermined light quantity. Thus, in the light detector 311, the presence of the returning light, that is, the presence of the recording mark can be determined by detecting the difference in light quantity.

The configuration shown in FIG. 7 may be used not only for the information reproducing apparatus 30 but also as the information recording and reproducing apparatus.

(Regarding Information Reproducing Method)

An information reproducing method according to the present embodiment will now be described in detail with reference to FIGS. 5 and 7.

The information reproducing apparatus 30 according to the present embodiment determines that the recording mark is not present when the returning light is observed by the light detector 311, and determines that the recording mark is present when the returning light is not observed. The information can be read from the optical information recording medium 10 by corresponding such that the binarized information has a value of "1", when the recording mark is observed, and the binarized information has a value of "0" when the recording mark is not observed.

The line of binarized information detected in the above manner is assumed as the reproduction signal, and executed by the CPU etc. of the reproducing apparatus control unit (not shown) to reproduce information recorded on the optical information recording medium 10.

The light flux A (reading light) controlled so as to be collected at the predetermined focal position by the focal position control unit 305 and the objective lens 307 is collected at the predetermined non-altered layer 103 of the optical information recording medium 10, as shown in FIG. 5. The light power of the reading light is preferably a light power lower than the recording light so as not to alter the non-altered layer 103. If the location where the reading light is collected is the location subjected to signal recording by the information recording apparatus 20 (i.e., location where the recording mark 107 exists), the light reflects due to drastic change in the index of refraction between the location at where the recording mark exists and other locations. If the location where the reading light is collected is the location not subjected to signal recording by the information recording apparatus 20 (i.e., location where the recording mark 107 does not exist), reflected light does not generate since change in index of refraction barely exists.

The returning light is converted to a parallel light after passing through the objective lens 307, and the returning light branched by the beam splitter 303 is collected by the light collecting lens 309 and entered to the light detector 311 to be detected by the light detector 311.

The optical information recording medium 10 according to the present embodiment has a clear interface between the non-altered layer 103 and the altered layer 105 by the above described initialization process, and in addition, has the recording mark 107 formed in the non-altered layer 103 formed so as to contact the adjacent altered layer 105. Therefore, the interface between the portion where the recording mark exists and the portion where the recording mark does not exist is clear even when reading out the recording mark by the information reproducing apparatus 30 according to the present embodiment, and the reading error due to stray light at the interface can be reduced. Therefore, the information reproducing apparatus 30 according to the present embodiment can reproduce information with satisfactory signal to noise ratio (SNR).

As described above, in the information recording apparatus 20 and the information reproducing apparatus 30 according to the present embodiment, recordation and reproduction of information are performed using one type of light beam with respect to the optical information recording medium having a so-called threshold characteristic, and thus stable recordation and reproduction of information can be performed.

Furthermore, since the information recording apparatus and the information reproducing apparatus can be configured by a system similar to the recording material initialized by a simple light initialization device and the optical disc of the related art, the information recording apparatus and the information reproducing apparatus can be inexpensively manufactured, and are easily compatible with the optical disc of the related art.

Furthermore, an inexpensive optical information recording medium can be manufactured since the optical information recording medium according to the present embodiment does not have a complex configuration.

It should be understood by those skilled in the art that various modifications, combinations, sub-combinations and alterations may occur depending on design requirements and other factors insofar as they are within the scope of the appended claims or the equivalents thereof.

In the above embodiments, a case where the information is recorded as recording mark in the non-altered layer has been described, but the information may be recorded as recording mark in the altered layer.

What is claimed is:

1. An information recording apparatus for recording information on a multi-layered optical information recording medium having a recording material, which has light reaction property and/or thermal chemical reaction property and which changes quality due to irradiated light and/or heat generated by the light, and including an altered layer in which the recording material is already altered and a non-altered layer in which the recording material is not yet altered alternately existing in plurals, the information recording apparatus comprising:
    a light source to emit a recording light having a predetermined wavelength;
    a focal position control unit to control a focal position of the recording light emitted from the light source; and
    an objective lens, arranged at a post-stage of the focal position control unit, to collect the recording light; wherein
    the recording material at the focal position is altered through heat by the recording light to record information on the optical information recording medium as a recording mark,
    wherein the wavelength of the recording layer has a large difference between absorptance with respect to the altered layer and absorptance with respect to the non-altered layer.

2. The information recording apparatus according to claim 1, wherein a focal depth of the recording light is greater than or equal to a thickness of the altered layer and/or the non-altered layer.

3. The information recording apparatus according to claim 1, wherein the wavelength of the recording light has high absorptance with respect to the altered layer.

4. The information recording apparatus according to claim 1, wherein the wavelength of the recording light has high absorptance with respect to the non-altered layer.

5. The information recording apparatus according to claim 2, wherein
    the focal position control unit controls the focal position of the recording light so as to be a position where the non-altered layer exists; and
    the recording light alters the recording material in the non-altered layer to record the recording mark.

6. The information recording apparatus according to claim 2, wherein
    the focal position control unit controls the focal position of the recording light so as to be a position where the altered layer exists; and
    the recording light alters the recording material in the altered layer to record the recording mark.

7. The information recording apparatus according to claim 1, wherein
    the focal position control unit is configured by one or more optical members; and
    the focal position of the recording light is controlled by changing the position of the one or more optical members.

8. The information recording apparatus according to claim 7, wherein the focal position control unit is configured by a relay lens or a collimator lens.

9. The information recording apparatus according to claim 1, wherein a first layer to be recorded with the recording mark has large optical absorption at a wavelength of the recording light compared to a second layer not to be recorded with the recording mark.

10. The information recording apparatus according to claim 1, wherein a first layer to be recorded with the recording mark has large heat conduction constant compared to a second layer not to be recorded with the recording mark.

11. The information recording apparatus according to claim 1, wherein a first glass transition temperature of a first layer to be recorded with the recording mark is lower than a second glass transition temperature of a second layer not to be recorded with the recording mark.

12. The information recording apparatus according to claim 1, wherein
    the optical information recording medium is initialized by two initialization light beams;
    one of the two initialization light beams enters the optical information recording medium from a first surface on one side of the optical information recording medium; and
    the other of the two initialization light beams enters the optical information recording medium from a second surface on the other side of the optical information recording medium.

13. The information recording apparatus according to claim 12, wherein magnitudes of incident angles with respect to the surfaces of the optical information recording medium of the two initialization light beams are equal.

14. The information recording apparatus according to claim 13, wherein
    the initialization is performed using the initialization light beam of wavelength $\lambda$ nm such that thicknesses of the altered layer and the non-altered layer become $\Delta D$ nm; and
    the incident angle $\theta$ of the two initialization light beams takes a value obtained from Equation 1.

$$\theta = \sin^{-1}\left(\frac{\lambda}{2\Delta D}\right) \quad \text{(Equation 1)}$$

15. The information recording apparatus according to claim 1, wherein the optical information recording medium is initialized by an initialization light beam of a wavelength having light sensitivity with respect to the recording material.

16. The information recording apparatus according to claim 15, wherein the initialization light beam is a parallel light beam.

17. The information recording apparatus according to claim 15, wherein a beam diameter of the initialization light beam has a size for irradiating the entire surface of the recording material.

18. An information reproducing apparatus for reading and reproducing a recorded recording mark from an optical information recording medium having a recording material, which has light reaction property and/or thermal chemical reaction property and which changes quality due to irradiated light and/or heat generated by the light, including an altered layer in which the recording material is already altered and a non-altered layer in which the recording material is not yet altered alternately existing in plurals, and including information recorded as the recording mark involving alteration through heat in the altered layer or the non-altered layer, the information reproducing apparatus comprising:
    a light source to emit a reading light having a predetermined wavelength;

a focal position control unit to control a focal position of the reading light emitted from the light source;

an objective lens arranged at a post-stage of the focal position control unit, to collect the reading light; and a light detector to detect a returning light corresponding to the reading light from the recording mark;

wherein the optical information recording medium is initialized by two initialization light beams;

one of the two initialization light beams enters the optical information recording medium from a first surface on one side of the optical information recording medium; and the other of the two initialization light beams enters the optical information recording medium from a second surface on the other side of the optical information recording medium.

19. The information reproducing apparatus according to claim 18, wherein a focal depth of the reading light is greater than or equal to a thickness of the altered layer and/or the non-altered layer.

20. The information reproducing apparatus according to claim 18, wherein the wavelength of the reading light is the same as a wavelength of a recording light used to record the recording mark.

21. The information reproducing apparatus according to claim 18, wherein the wavelength of the reading light has low absorptance with respect to the non-altered layer compared to a recording light used in recording the recording mark.

22. The information reproducing apparatus according to claim 18, wherein the wavelength of the reading light has low absorptance with respect to the altered layer compared to a recording light used in recording the recording mark.

23. The information reproducing apparatus according to claim 19, wherein the focal position control unit controls the focal position of the reading light so as to be a position where the non-altered layer exists; and the light detector detects the returning light from the recording mark in the non-altered layer.

24. The information reproducing apparatus according to claim 19, wherein the focal position control unit controls the focal position of the reading light so as to be a position where the altered layer exists; and the light detector detects the returning light from the recording mark in the altered layer.

25. The information reproducing apparatus according to claim 18, wherein the focal position control unit is configured by one or more optical members; and the focal position of the reading light is controlled by changing the position of the one or more of optical members.

26. The information reproducing apparatus according to claim 25, wherein the focal position control unit is configured by a relay lens or a collimator lens.

27. The information reproducing apparatus according to claim 18, wherein magnitudes of incident angles with respect to the surfaces of the optical information recording medium of the two initialization light beams are equal.

28. The information reproducing apparatus according to claim 27, wherein the initialization is performed using the initialization light beam of wavelength $\lambda$ nm such that thicknesses of the altered layer and the non-altered layer become $\Delta D$ nm; and the incident angle $\theta$ of the two initialization light beams takes a value obtained from Equation 1.

$$\theta = \sin^{-1}\left(\frac{\lambda}{2\Delta D}\right) \qquad \text{(Equation 1)}$$

29. The information reproducing apparatus according to claim 18, wherein the optical information recording medium is initialized by an initialization light beam of a wavelength having light sensitivity with respect to the recording material.

30. The information reproducing apparatus according to claim 18, wherein the initialization light beam is a parallel light beam.

31. The information reproducing apparatus according to claim 18, wherein a beam diameter of the initialization light beam has a size for irradiating the entire surface of the recording material.

* * * * *